United States Patent
Tsai et al.

(10) Patent No.: US 12,296,954 B2
(45) Date of Patent: May 13, 2025

(54) THIN WING DRIVE MECHANISM

(71) Applicant: The Boeing Company, Chicago, IL (US)

(72) Inventors: Kevin R. Tsai, Seattle, WA (US); Mark Steven Good, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/703,025

(22) Filed: Mar. 24, 2022

(65) Prior Publication Data
US 2022/0380021 A1 Dec. 1, 2022

Related U.S. Application Data

(60) Provisional application No. 63/193,425, filed on May 26, 2021.

(51) Int. Cl.
*B64C 9/02* (2006.01)
*B64C 13/30* (2006.01)

(52) U.S. Cl.
CPC ............... *B64C 9/02* (2013.01); *B64C 13/30* (2013.01)

(58) Field of Classification Search
CPC .................................. B64C 9/02; B64C 13/30
See application file for complete search history.

(56) References Cited

U.S. PATENT DOCUMENTS

| | | | | |
|---|---|---|---|---|
| 4,399,970 A * | 8/1983 | Evans | ....................... | B64C 9/24 244/99.3 |
| 5,966,997 A * | 10/1999 | Halm | ....................... | B64C 9/18 74/44 |
| 9,108,724 B2 * | 8/2015 | Rechsiek | ........... | B64D 45/0005 |
| 9,415,859 B2 * | 8/2016 | Okabe | ....................... | B64C 9/22 |
| 2010/0140414 A1 * | 6/2010 | Beyer | ....................... | B64C 9/24 244/134 B |
| 2011/0290946 A1 * | 12/2011 | Peirce | ....................... | B64C 9/22 244/213 |
| 2012/0091282 A1 * | 4/2012 | Spiller | ............... | B64D 45/0005 701/33.9 |

(Continued)

FOREIGN PATENT DOCUMENTS

| | | | | |
|---|---|---|---|---|
| CN | 103847956 A | * | 6/2014 | ............... B64C 9/02 |
| EP | 0052240 A1 | * | 5/1982 | ............... B64C 9/02 |

(Continued)

*Primary Examiner* — Assres H Woldemaryam
*Assistant Examiner* — Anna L. Gordon
(74) *Attorney, Agent, or Firm* — Kunzler Bean & Adamson

(57) ABSTRACT

A flap actuation mechanism incorporates a coupler rod eccentrically supported at an aft end and at a forward end. The coupler rod is configured to translate from an aft position to a forward position. An inboard crank arm is coupled to the rotary actuator and engaged to the aft end of the coupler rod. The inboard crank is configured rotate responsive to rotation of the rotary actuator thereby inducing translation of the coupler rod. An outboard crank arm engaged to a forward end of the coupler rod and is configured to rotate responsive to translation of the coupler rod. A flap drive arm is attached to the outboard crank arm and is configured to rotate with the outboard crank arm from a stowed position to a deployed position responsive to translation of the coupler rod from the aft position to the forward position.

20 Claims, 17 Drawing Sheets

(56) References Cited

U.S. PATENT DOCUMENTS

| | | | | |
|---|---|---|---|---|
| 2012/0248257 A1* | 10/2012 | Eichhorn | ............... | B64C 9/04 |
| | | | | 74/99 R |
| 2014/0138481 A1* | 5/2014 | Sakota | ............... | B64C 9/24 |
| | | | | 244/99.3 |
| 2021/0114718 A1* | 4/2021 | Toyoda | ............... | B64C 9/02 |
| 2022/0177115 A1* | 6/2022 | Lamaille | ............... | B64C 21/04 |

FOREIGN PATENT DOCUMENTS

| | | | | | |
|---|---|---|---|---|---|
| EP | 2808250 A1 | * | 12/2014 | ............ | B64C 13/38 |
| EP | 3594108 A1 | * | 1/2020 | ............ | B64C 13/28 |
| JP | 2005249024 A | * | 9/2005 | ............ | F16C 17/022 |

* cited by examiner

THIN WING DRIVE MECHANISM

REFERENCES TO RELATED APPLICATIONS

This application claims priority of U.S. provisional application Ser. No. 63/193,425 filed on May 26, 2021 entitled THIN WING DRIVE MECHANISM, having a common assignee with the present application, the disclosure of which is incorporated herein by reference.

BACKGROUND INFORMATION

Field

This disclosure relates generally to the field of aircraft aerodynamic surface drive systems and, more particularly to a deployment system housed within a thin wing profile for slats or flaps.

Background

Aircraft employ aerodynamic surfaces such as slats and flaps which deploy to increase camber and chord of the wings for enhanced performance in takeoff and landing. Various mechanical arrangements have been developed to deploy these aerodynamic surfaces from retracted to extended positions. As the chord thickness decreases in modern thin wings, available cross sectional area for housing deployment systems including actuators and motion linkages for the aerodynamic surfaces is significantly reduced particularly for leading edge flaps or slats. Locating a rotary actuator and drive mechanism near the leading edge of the wing where the loft is shallow is difficult and may require complex linkages.

It is therefore desirable to provide an underwing support which overcomes these shortcomings in the prior art.

SUMMARY

The exemplary implementations disclosed herein provide a flap system having a rotary actuator and a flap actuation mechanism. The flap actuation mechanism incorporates a coupler rod eccentrically supported at an aft end and at a forward end. The coupler rod is configured to translate from an aft position to a forward position. An inboard crank arm is coupled to the rotary actuator and engaged to the aft end of the coupler rod. The inboard crank is configured rotate responsive to rotation of the rotary actuator thereby inducing translation of the coupler rod. An outboard crank arm engaged to a forward end of the coupler rod and is configured to rotate responsive to translation of the coupler rod. A flap drive arm is attached to the outboard crank arm and is configured to rotate with the outboard crank arm from a stowed position to a deployed position responsive to translation of the coupler rod from the aft position to the forward position. A flap connected to the flap drive arm and rotated from a retracted condition with the flap drive arm in the stowed position to an extended condition with the flap drive arm in the deployed position.

The exemplary implementations provide a method for extending a flap. An inboard crank arm coupled to a rotary actuator and engaged to an aft end of a coupler rod is rotated. The coupler rod eccentrically supported at the aft end and a forward end is translated from an aft position to a forward position responsive to rotation of the inboard crank arm. An outboard crank arm engaged to the forward end of the coupler rod is rotated responsive to translation of the coupler rod. A flap drive arm attached to the outboard crank arm is rotated from a stowed position to a deployed position responsive to rotation of the outboard crank arm by translation of the coupler rod from the aft position to the forward position.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a flap actuation mechanism having a coupler rod eccentrically supported by a first crank pin of a first eccentric half crank and eccentrically supported at a forward end by a second crank pin extending from a second eccentric half crank. A rotary actuator drives the first eccentric half crank. The second eccentric half crank rotates a flap drive arm from a retracted position to a deployed position. A flap connected to the flap drive arm is rotated from a stowed configuration to an extended configuration responsive to the flap drive arm rotation from the retracted position to the deployed position. While implementations are described herein with reference to a flap actuation mechanism for a leading edge flap system employing a Krueger flap configuration, implementations may be applicable to any leading edge flap system or other aerodynamic surface actuation or deployment mechanism.

Figure 1A:
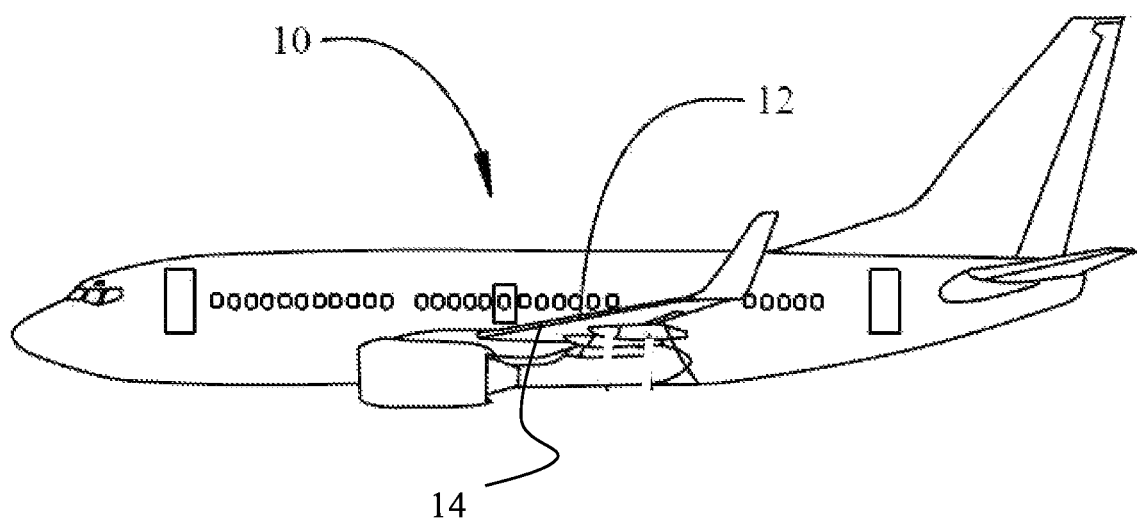
FIG. 1A is a representation of an aircraft in which the implementations disclosed herein may be employed.
Figure 1B:
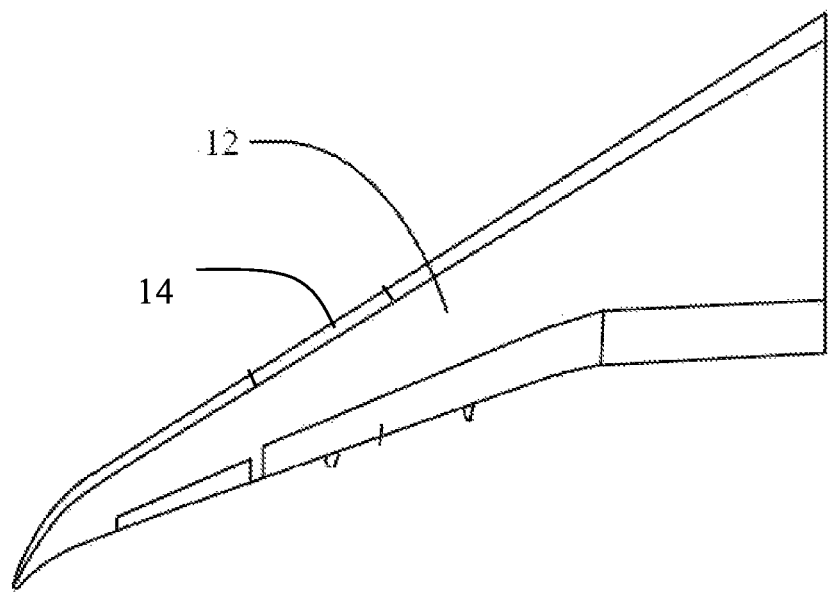
FIG. 1B is a top view of the wing and flaps of the aircraft of FIG. 2A.

Referring to the drawings, FIGS. 1A and 1B depict an aircraft 10 having a wing 12 with a system of leading edge operating flaps 14. The flaps 14 are engaged to the wing 12 at multiple attachment points. The flaps 14 are deployed to enhance aerodynamic performance during takeoff and landing with a flap actuation mechanism 18 (to be described in subsequent figures) that causes the flaps 14 forward and downward relative to the wing 12.

Figure 2A:
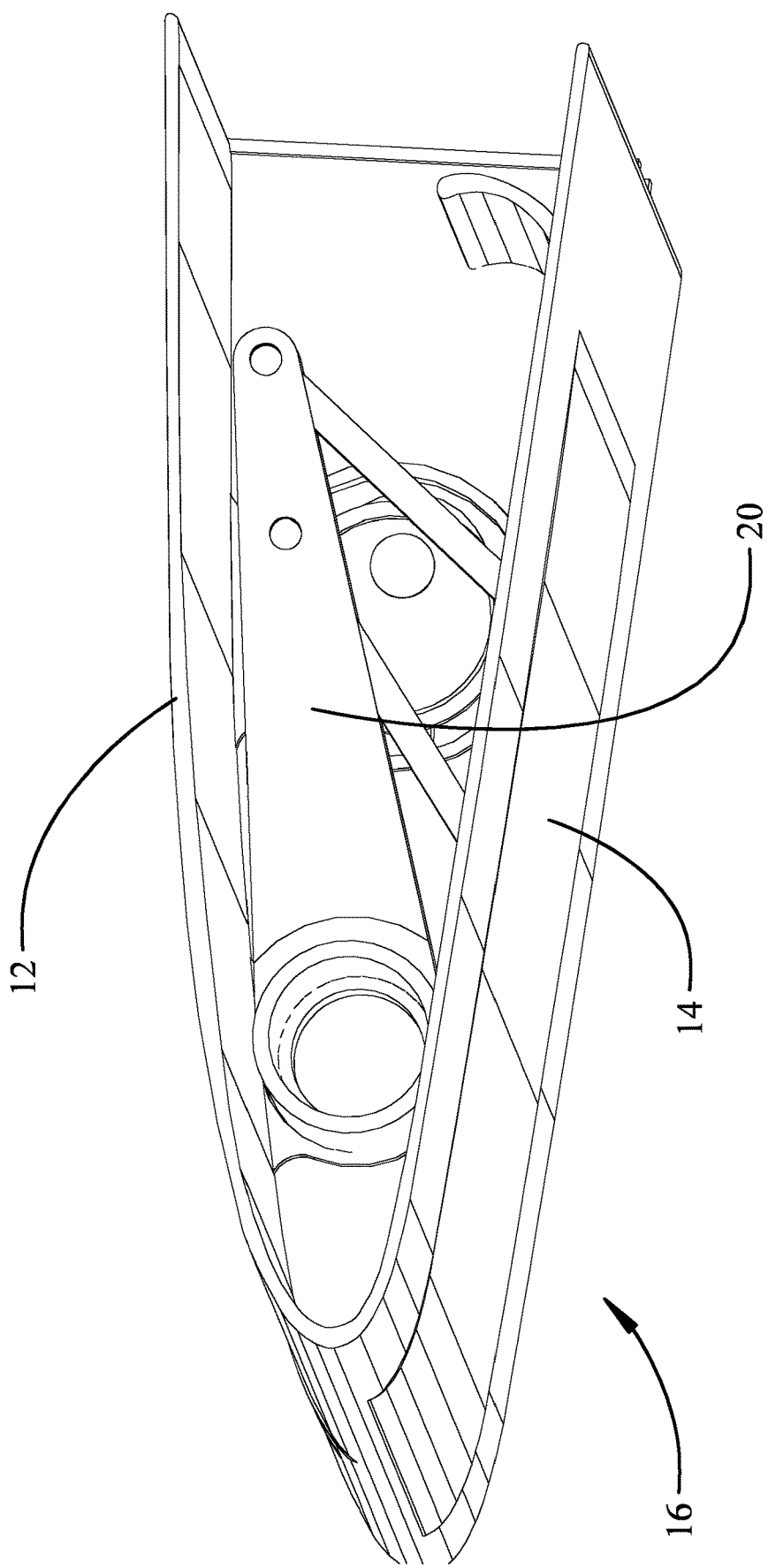
FIG. 2A is a pictorial view of a section of the wing showing a flap in the retracted position, the outboard support rib removed for clarity.
Figure 2B:
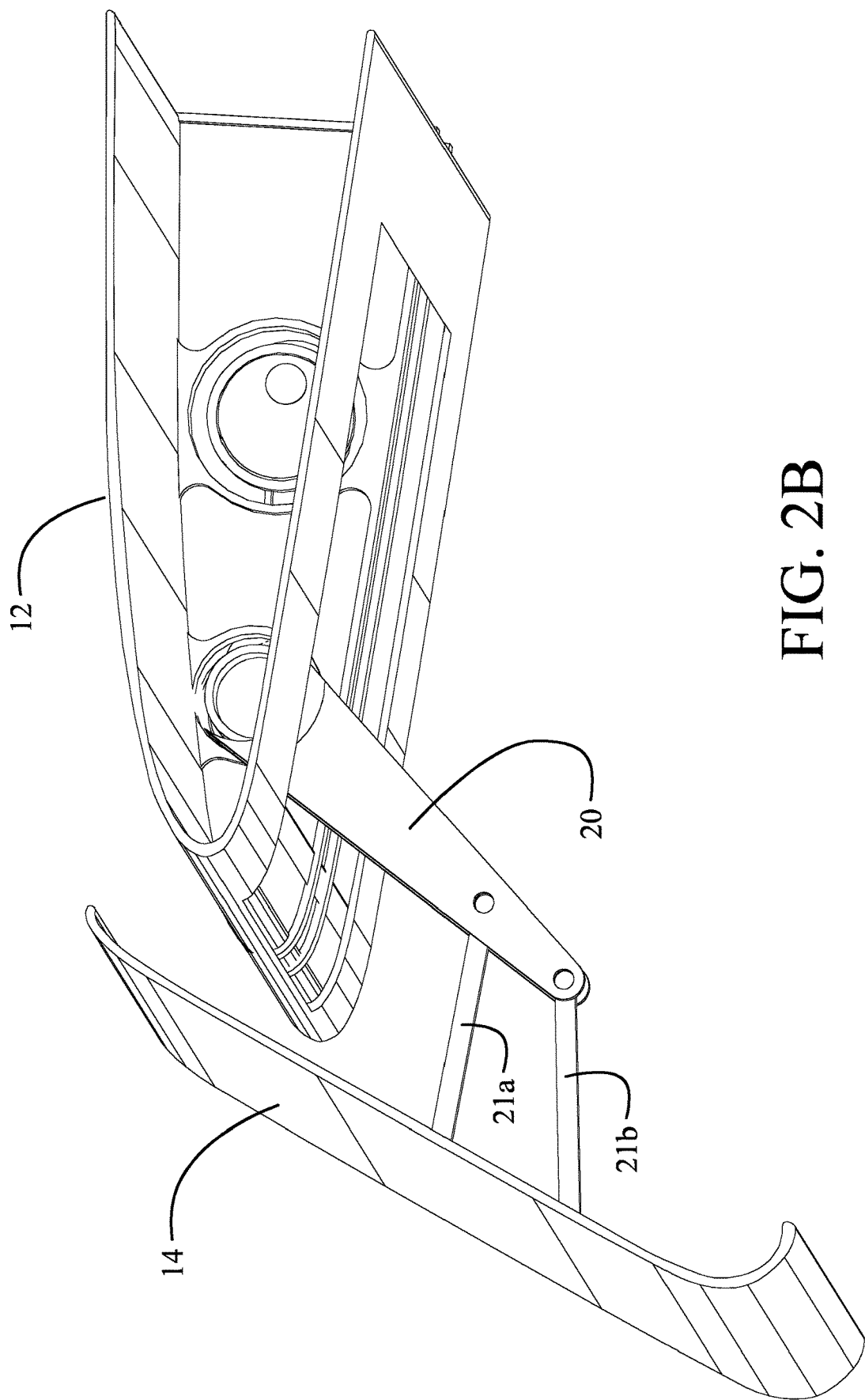
FIG. 2B is a pictorial view of the section of the wing showing the flap in the extended position.

As seen in FIG. 2A, with an outboard support rib removed, flap 14 is in the retracted condition with flap drive arm 20 in a stowed position. FIG. 2B shows the flap 14 in the extended condition with flap drive arm in a deployed position. Flap 14 is attached to the flap drive arm 20 with connection links 21*a* and 21*b*. Idler links or tracks to induce relative rotation of the connection links 21*a*, 21*b* with respect to the flap drive arm 20 are not shown for simplicity in presentation.

Figure 3A:
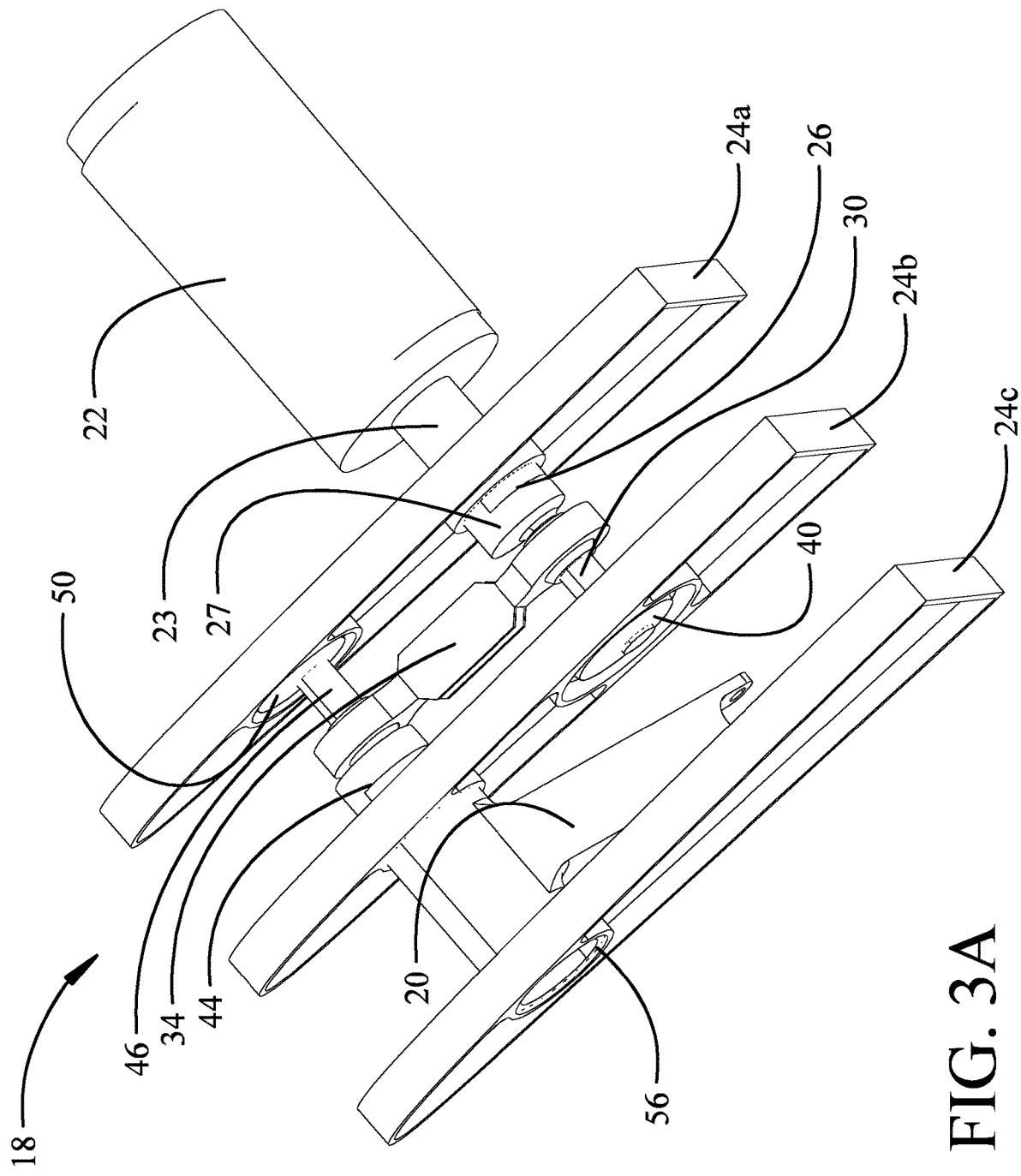
FIG. 3A is a pictorial representation of a first implementation of a flap extension mechanism.
Figure 3B:
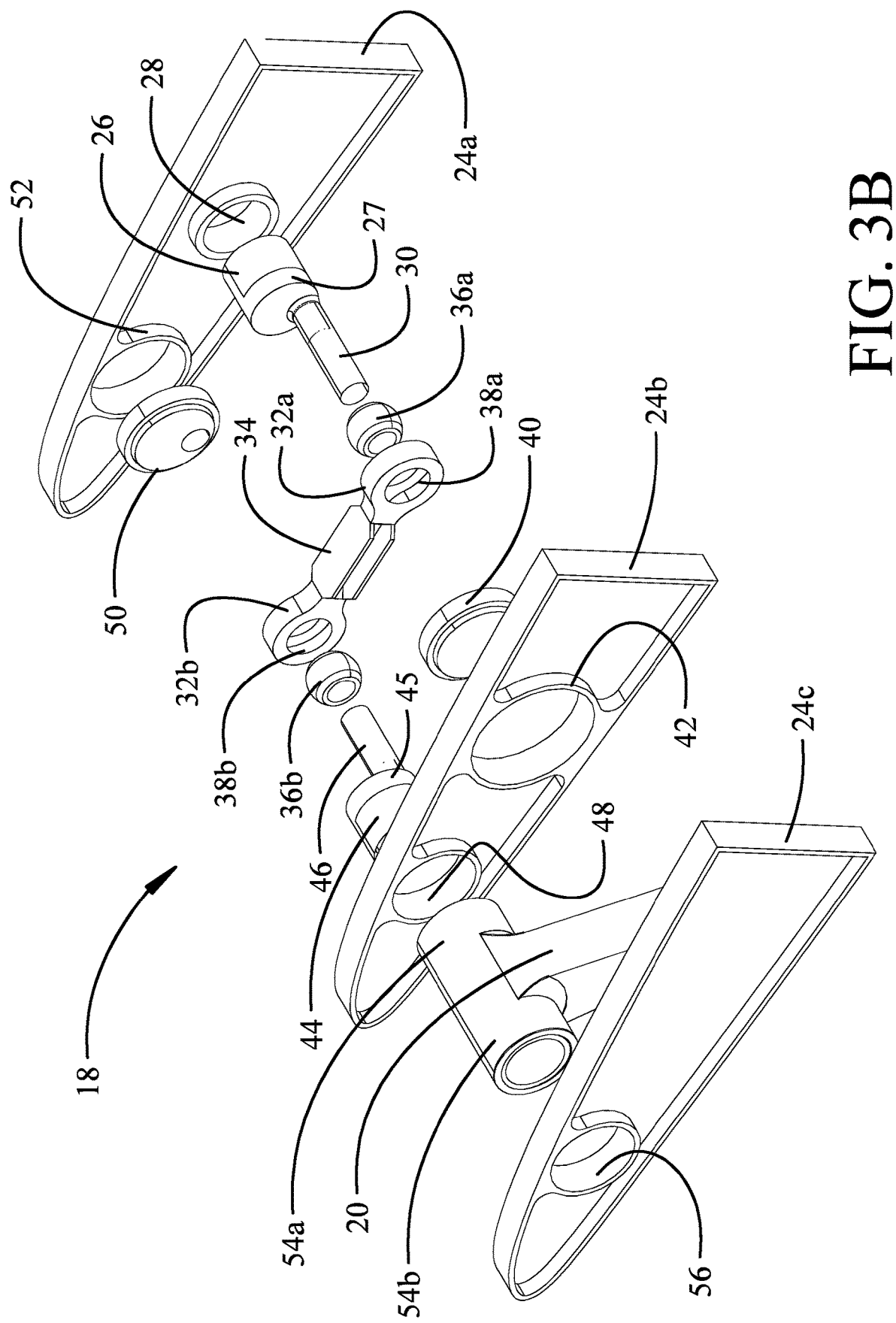
FIG. 3B is an exploded outboard to inboard view of the first implementation.
Figure 3C:
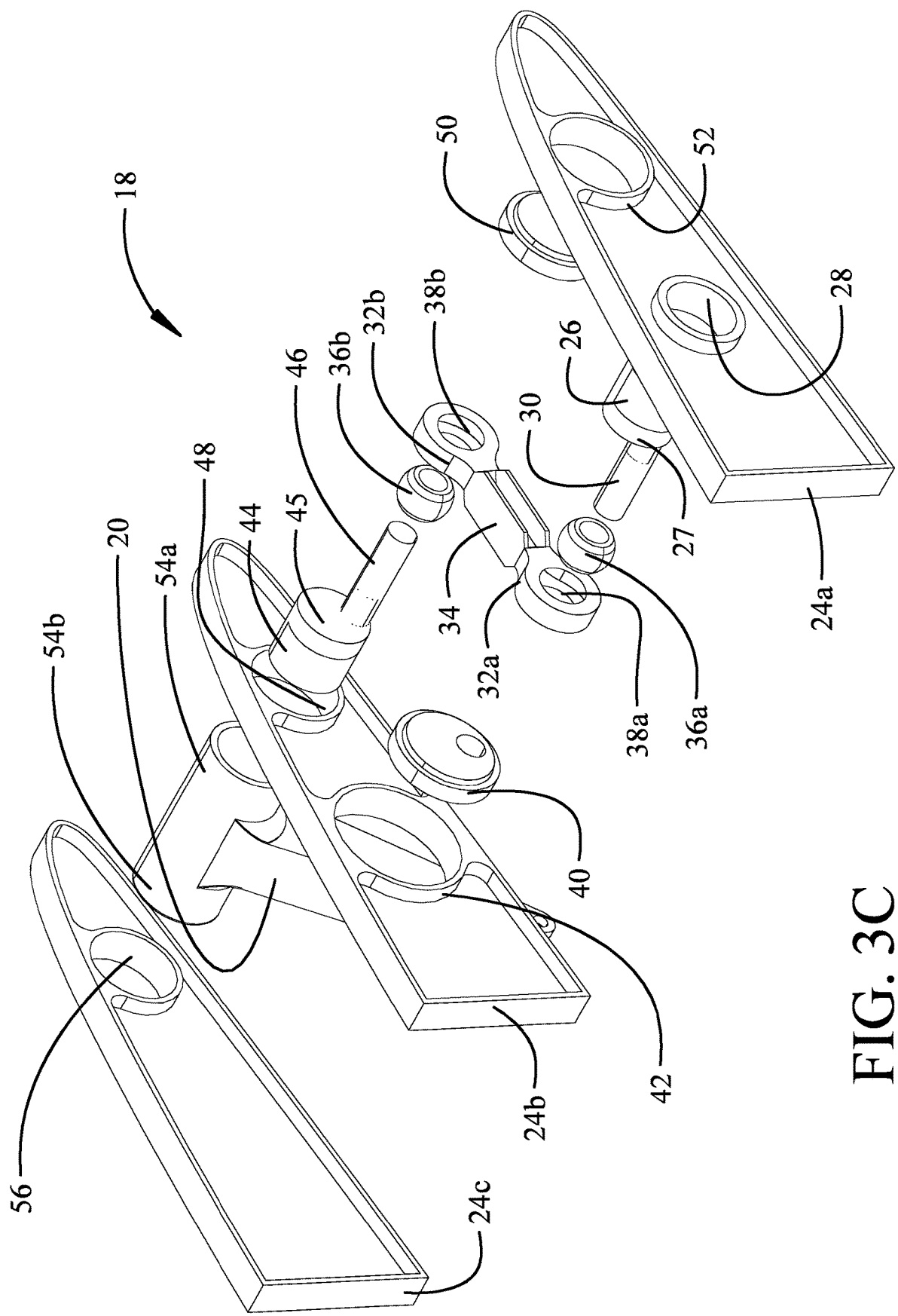
FIG. 3C is an exploded inboard to outboard view of the first implementation.

For an example flap system 16, an implementation of the flap actuation mechanism 18 is seen in FIGS. 3A-3C. A rotary actuator 22 and the flap actuation mechanism 18 are supported within the wing 12 by an inboard support rib 24*a*, central support rib 24*b* and an outboard support rib 24*c*. A coupler rod 34 is eccentrically supported at an aft end 32*a* and a forward end 32*b* and configured to translate from an aft position to a forward position. An inboard crank arm 27 coupled to the rotary actuator 22 is engaged to the aft end 32*a* of the coupler rod 34 and configured rotate responsive to rotation of the rotary actuator 22 thereby inducing translation of the coupler rod 34. An outboard crank arm 45 is engaged to a forward end 32*b* of the coupler rod 34 and configured to rotate responsive to translation of the coupler rod 34. The flap drive arm 20 is attached to the outboard crank arm 45 and is configured to rotate from the stowed position to the deployed position responsive to translation of the coupler rod from the aft position to the forward position.

As seen in detail in the drawings, a drive shaft 23 extending from the rotary actuator 22 drives a first eccentric half crank 26 rotatably supported in the inboard support rib 24*a* by an aft bearing 28 (represented as the race only without balls or rollers for simplicity). The drive shaft 23 is connected to rotate the first eccentric half crank 26 in the example implementation with concentric engagement of mating splines (not shown for simplicity). The first eccentric half crank 26 incorporates the inboard crank arm 27. A first crank pin 30 extending from the inboard crank arm 27 is operably coupled to the aft end 32*a* of the coupler rod 34 through a first spherical bearing 36*a* in an aft aperture 38*a*. An outboard end of the first crank pin 30 is supported in a first eccentric bearing 40 mounted in a boss 42 in the central support rib 24*b*.

The forward end 32*b* of the coupler rod 34 is operably coupled to a second eccentric half crank 44. The second eccentric half crank 44 incorporates the outboard crank arm 45. A second crank pin 46 extends from the outboard crank arm 45 through a second spherical bearing 36*b* in a forward aperture 38*b* of the coupler rod 34. The second eccentric half crank 44 is rotatably supported in the central support rib 24*b* with a forward bearing 48 (represented in the drawings as the race only without balls or rollers for simplicity). The inboard end of the second crank pin 46 is supported in a second eccentric bearing 50 in a boss 52 in the inboard support rib 24*a*.

The second eccentric half crank 44 is connected to rotate the flap drive arm 20. In the example implementation, the flap drive arm 20 has an inboard cylindrical stub 54*a* connected to the second eccentric crank 44 with concentric engagement of mating splines (not shown for simplicity). An outboard cylindrical stub 54*b* of the flap drive arm 20 is supported in an outboard bearing 56 (represented as the race only without balls or rollers for simplicity) in the outboard support rib 24*c*.

Figure 4:
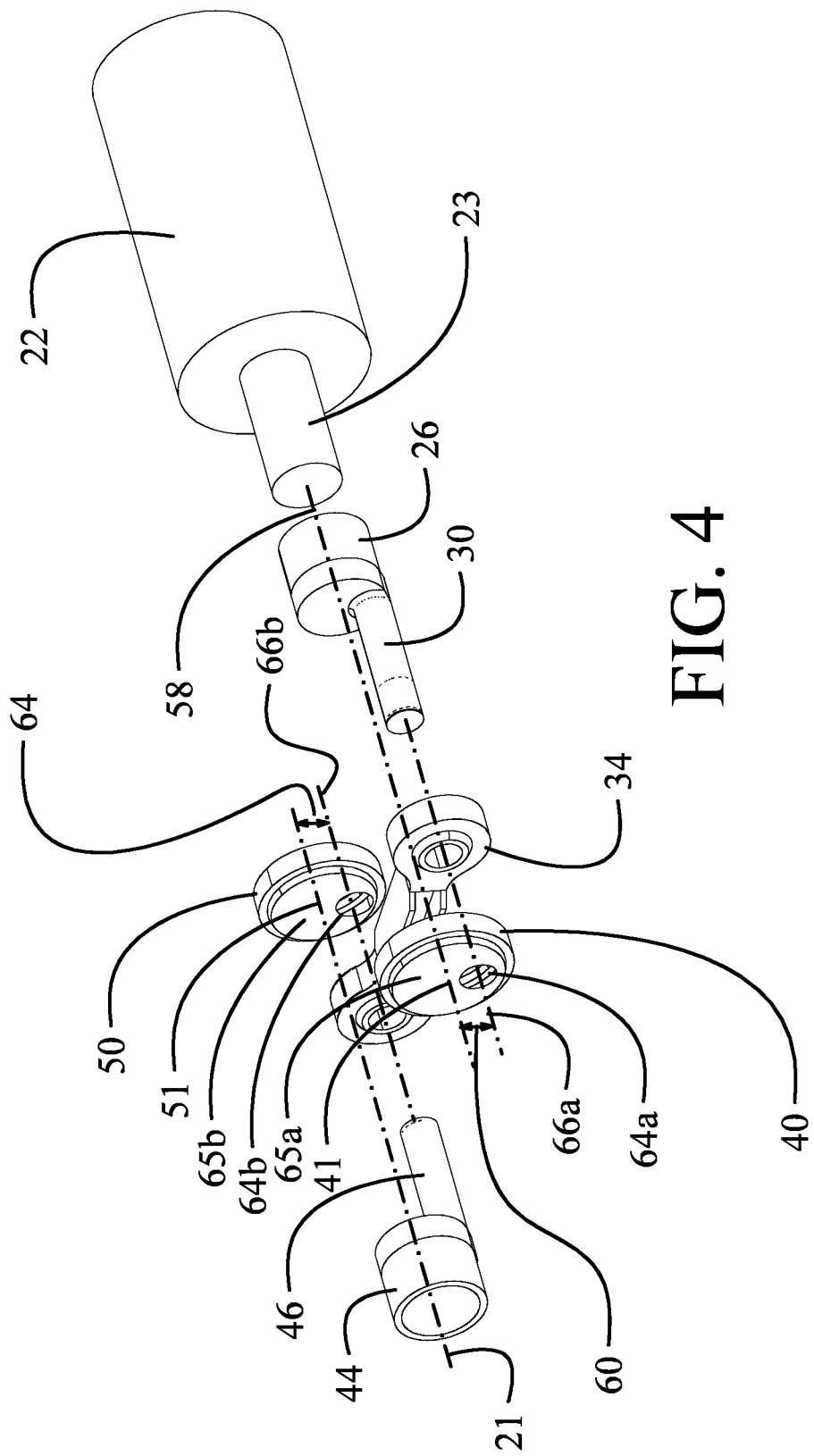
FIG. 4 is an exploded view of the eccentric support and rotating components for translation of the coupler rod.

As seen in FIG. 4, the eccentric support of the aft end 32*a* of the coupler rod 34 by positioning of the first crank pin 30 with respect to a rotation axis 58 of the drive shaft 23 and the center of rotation 41 of the first eccentric bearing 40 provides a first moment arm 60 for mechanical advantage from the drive shaft to the coupler rod 34 that can approach the maximum allowable within the chord depth 62*a* (seen in FIG. 5B) at that location in the wing. Similarly, the eccentric support of the forward end 32*b* of the coupler rod 34 provides a second moment arm 64 from the second crank pin 46 to the center of rotation 51 of the second eccentric bearing 50 and a rotation axis 21 of the flap drive arm 20 created by the eccentric positioning of the second crank pin 46 to provide mechanical advantage for rotation of the flap drive arm 20 with the second moment arm 64 approaching a maximum allowable with the chord depth 62*b* (seen in FIG. 5B) at that position of the wing. The dual eccentric arrangement minimizes load on the rotary actuator 22.

Additionally, the first and second crank pins 30, 46 are received in smooth bores 64*a*, 64*b* in the inner races 65*a* and 65*b* of the first and second eccentric bearings 40, 50 concentric with the pin axis 66*a*, 66*b* of the respective crank pin. This allows assembly without threaded connection or nuts requiring torquing. The outer races 67*a*, 67*b* of the first and second eccentric bearings 40, 50 are supported in the bosses 42 and 52 of the inboard and central support ribs 24*a*, 24*b* as previously described.

Figure 5A:
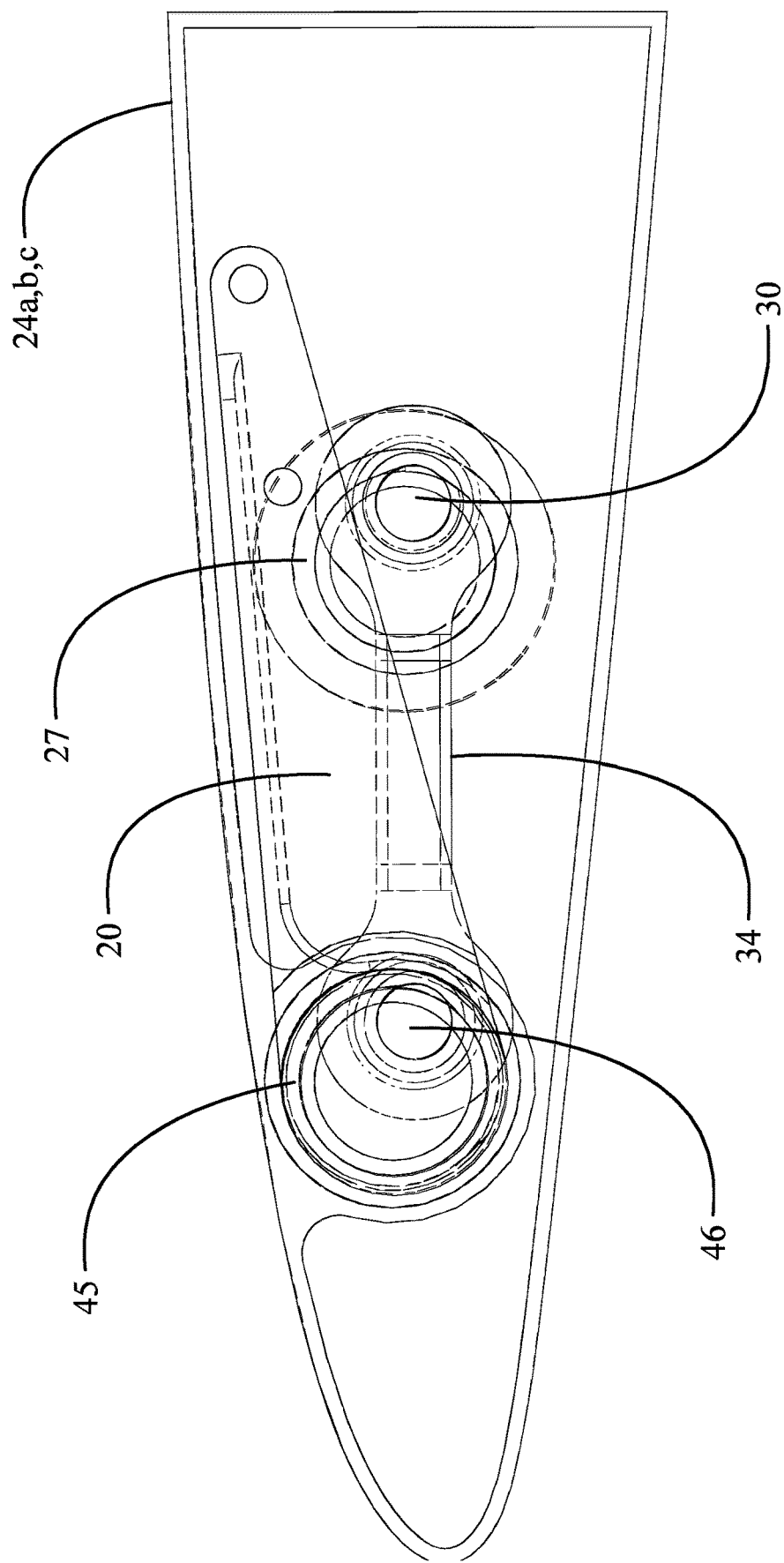
FIGS. 5A-5C are side views of the flap extension mechanism in the stowed position, 50% deployment and fully deployed positions with the support ribs remove for clarity.
Figure 5B:
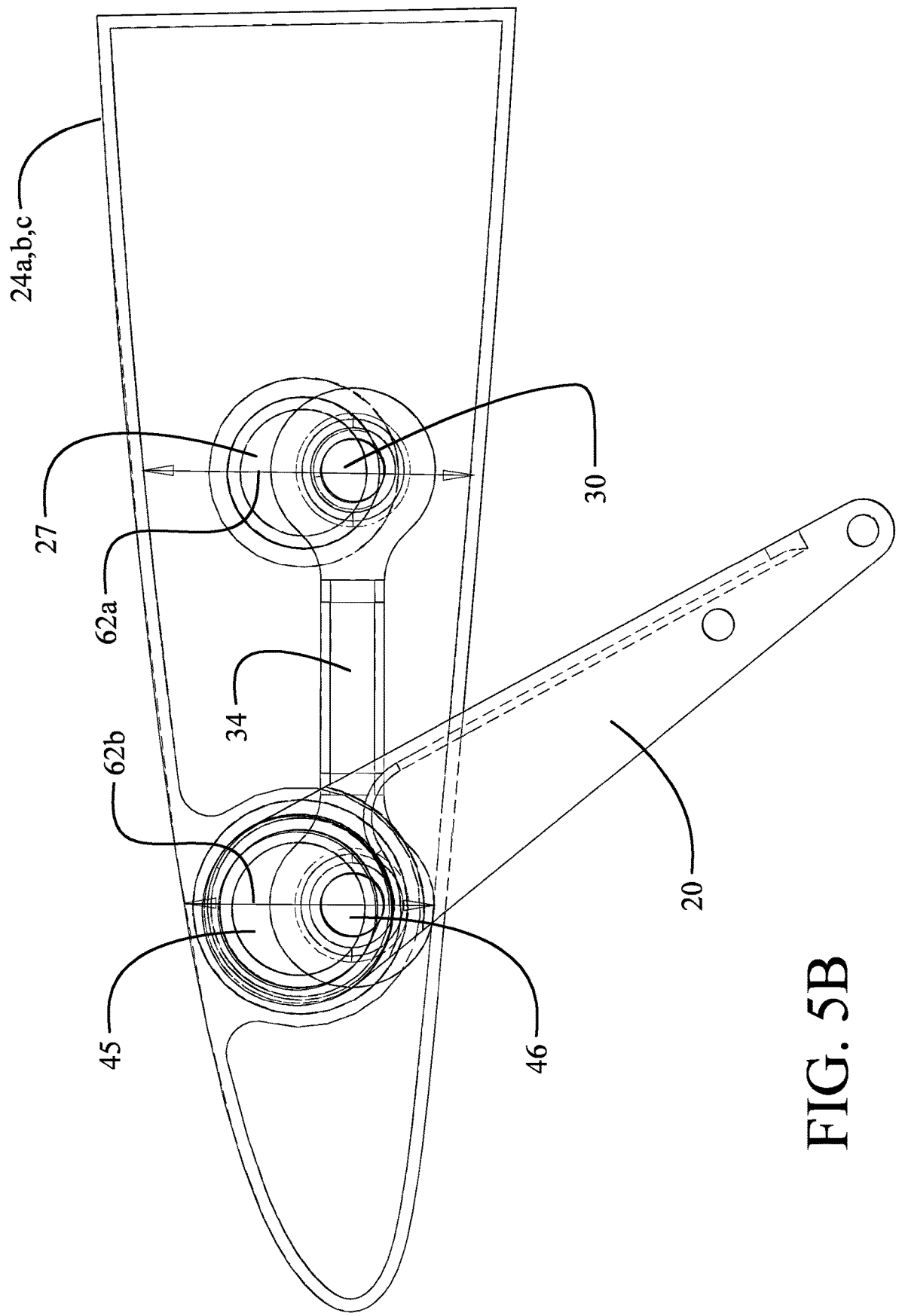
Figure 5C:
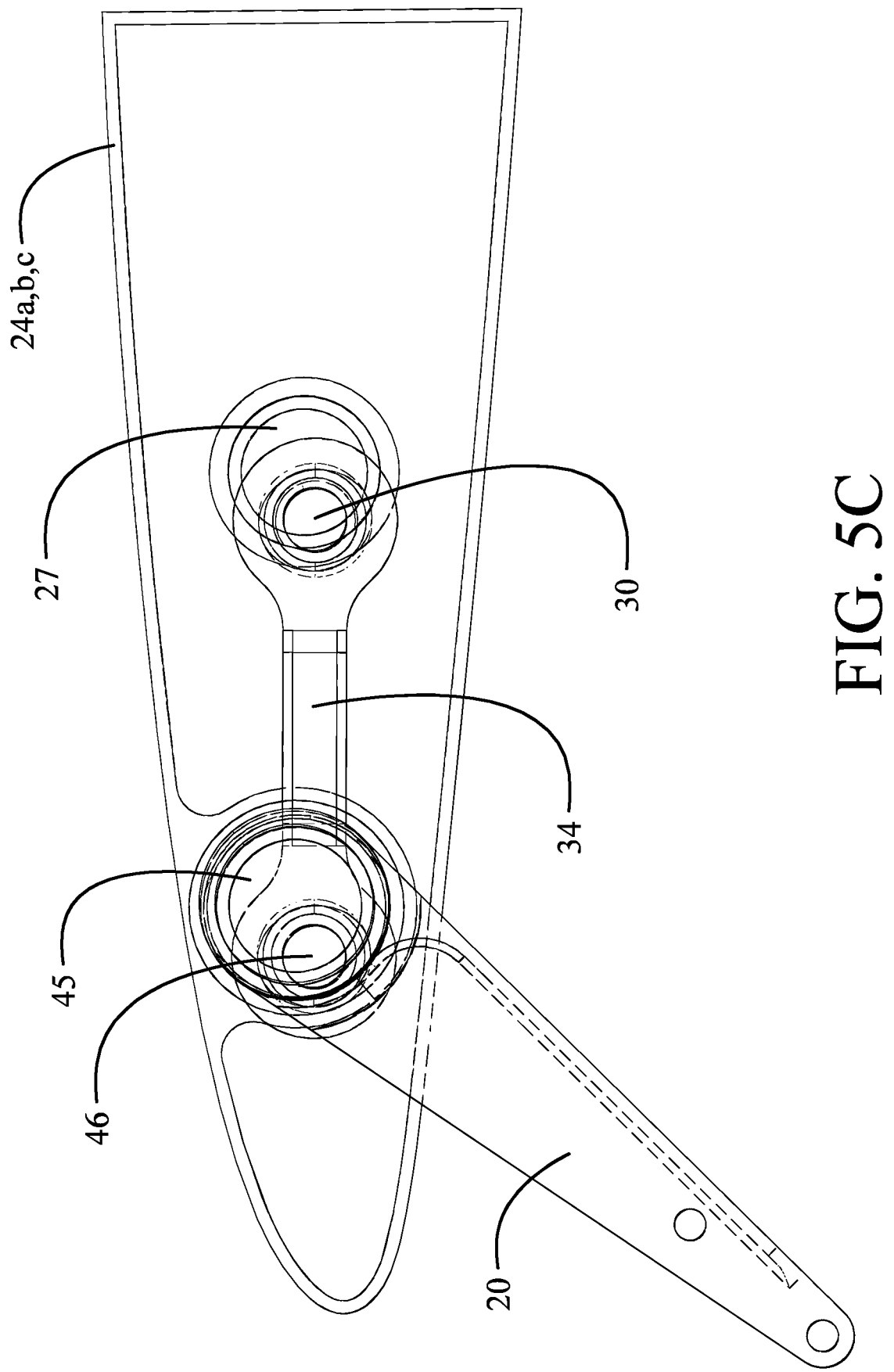

Operation of the first implementation of the flap actuation mechanism 18 is seen in FIGS. 5A-5C. In FIG. 5A the flap 14 is in the retracted position and the first and second eccentric half cranks 26, 44 are positioned with the inboard and outboard crank arms 27, 45 in a substantially horizontal aft facing alignment. Actuation of the rotary actuator 22 rotates the first eccentric half crank 26 driving the coupler rod 34 to rotate the second half crank 44 thereby rotating the flap drive arm 20 and at a 50% deployed position as shown in FIG. 5B, the first and second eccentric half cranks 26, 44 are positioned with the inboard and outboard crank arms 27, 45 in a substantially vertical position, downward in the example shown. Continuing rotation of the rotary actuator 22 results in full rotation of the flap drive arm 20 to the deployed position placing the flap 14 in the extended position as seen in FIG. 5C. In the fully deployed position the first and second eccentric half cranks 26, 44 are positioned with the inboard and outboard crank arms 27, 45 in a substantially horizontal forward position. For the example shown, the eccentric half cranks rotate through 180°.

Figure 6A:
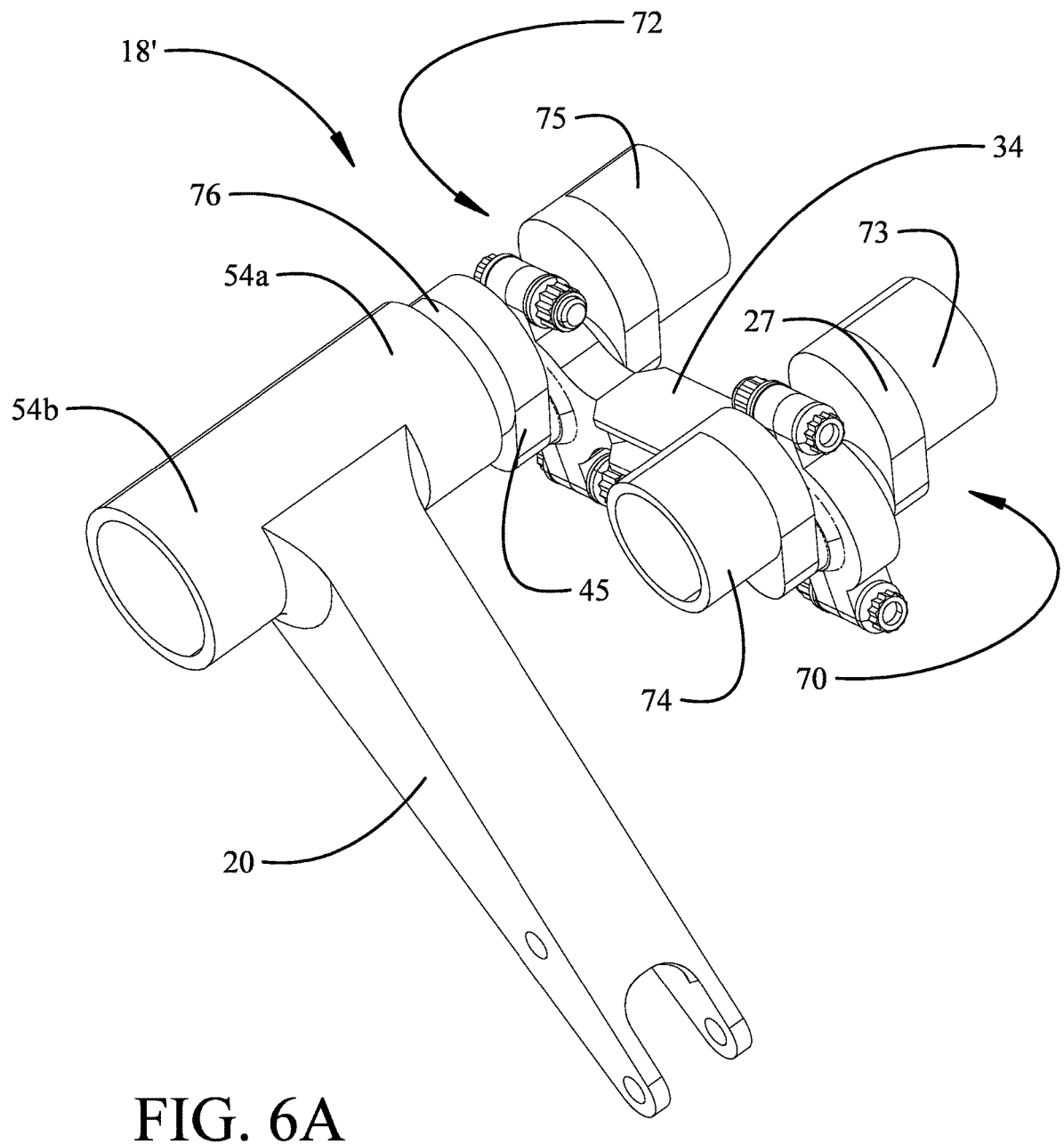
FIG. 6A is a pictorial representation of a second implementation of a flap extension mechanism.
Figure 6B:
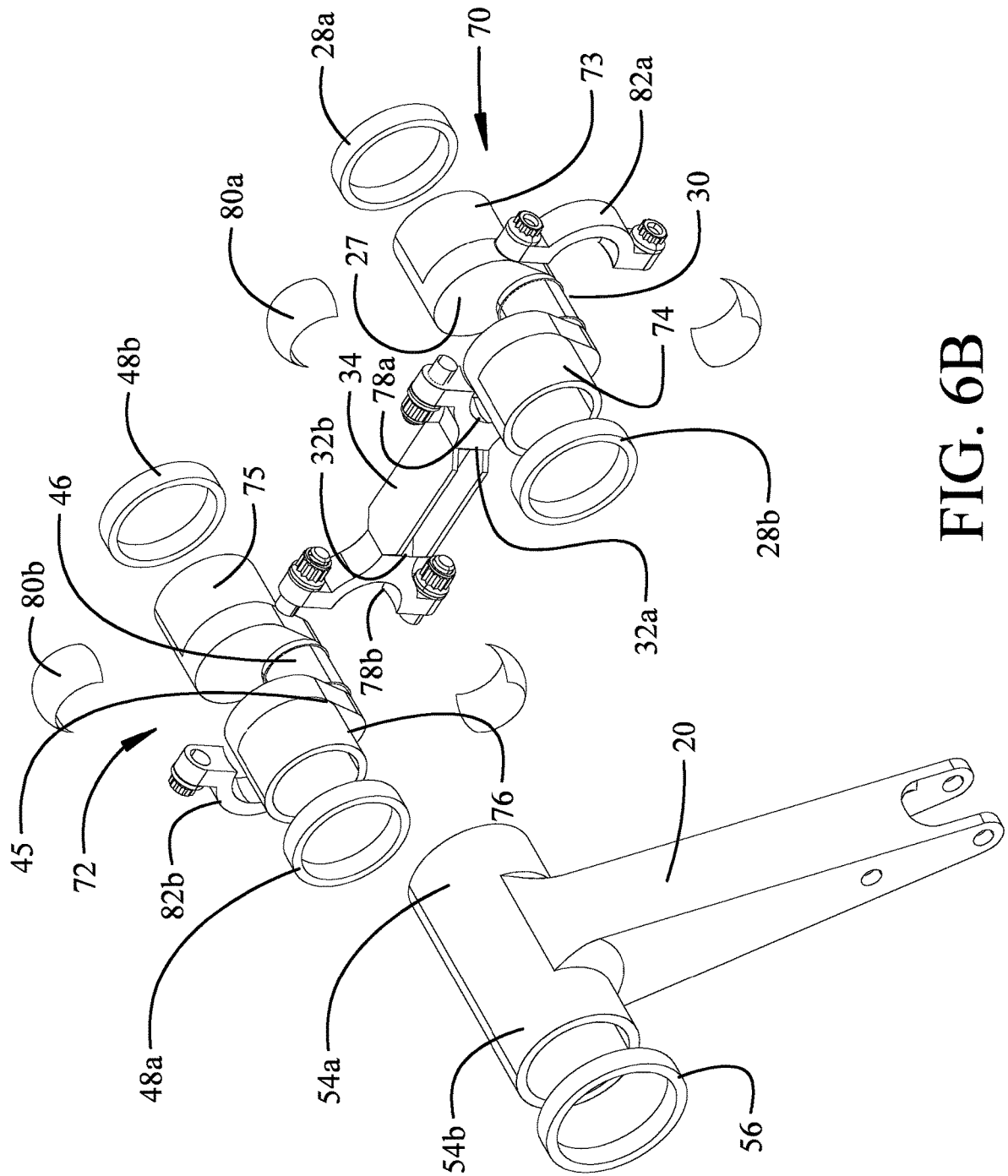
FIG. 6B is an exploded outboard to inboard view of the second implementation.
Figure 6C:
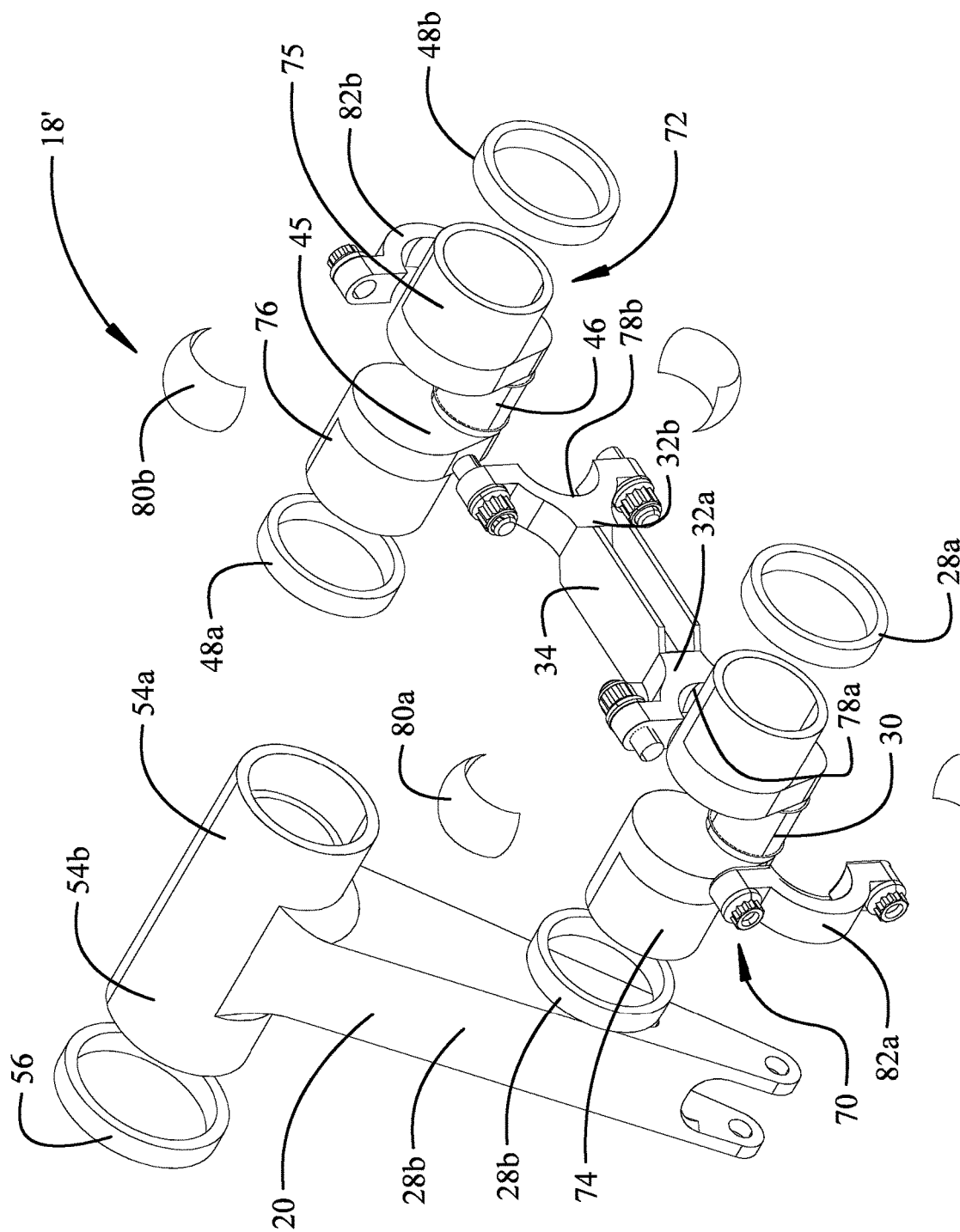
FIG. 6C is an exploded inboard to outboard view of the second implementation.

A second implementation of the flap actuation mechanism 18' is shown in FIGS. 6A-6C. The second implementation is also configured with rotatable eccentric support of the coupler rod 34 at both the aft end 32*a* and forward end 32*b* on first and second crank pins 30 and 46 for interconnected rotation of the inboard crank arm 27 and outboard crank arm 45 as in the first implementation. However, the first and second crank pins 30 and 46 are connected in an aft crankshaft 70 and a forward crankshaft 72. The inboard crank arm 27 is incorporated in the aft crankshaft 70 which is supported on an inboard stub 73 by an inboard aft bearing 28*a* in the inboard support rib (not shown) and engaged by the drive shaft 23 of the rotary actuator 22 as in the first implementation. The outboard stub 74 of the aft crankshaft 70 is supported by an outboard aft bearing 28*b* in the central support rib (not shown).

Forward crankshaft 72 incorporates the outboard crank arm 45 and is supported in an outboard forward bearing 48a with an inboard stub 75 supported by an inboard forward bearing 48b. As in the first implementation the outboard crank arm 45 is engaged to rotate the flap drive arm 20 with an outboard stub 76 of the forward crankshaft 72 configured for mating splined engagement with the inboard cylindrical stub 54a of the flap drive arm 20. As in the first implementation, the outboard cylindrical stub 54b of the flap drive arm 20 is supported in an outboard bearing 56 in the outboard support rib 24c (not shown).

For the example implementation as shown in the drawings, engagement of the first crank pin 30 with the coupler rod 34 is accomplished with an aft saddle 78a at the aft end 32a receiving an aft split spherical bearing 80a secured by an aft arch clamp 82a. Similarly, engagement of the second crank pin 46 at the forward end 32b is accomplished with a forward saddle 78b receiving a forward split spherical bearing 80b secured by a forward arch clamp 82b. Implementation of the aft crankshaft 70 and forward crankshaft 72 as monolithic cast, forged or machined components is expected.

Figure 7A:
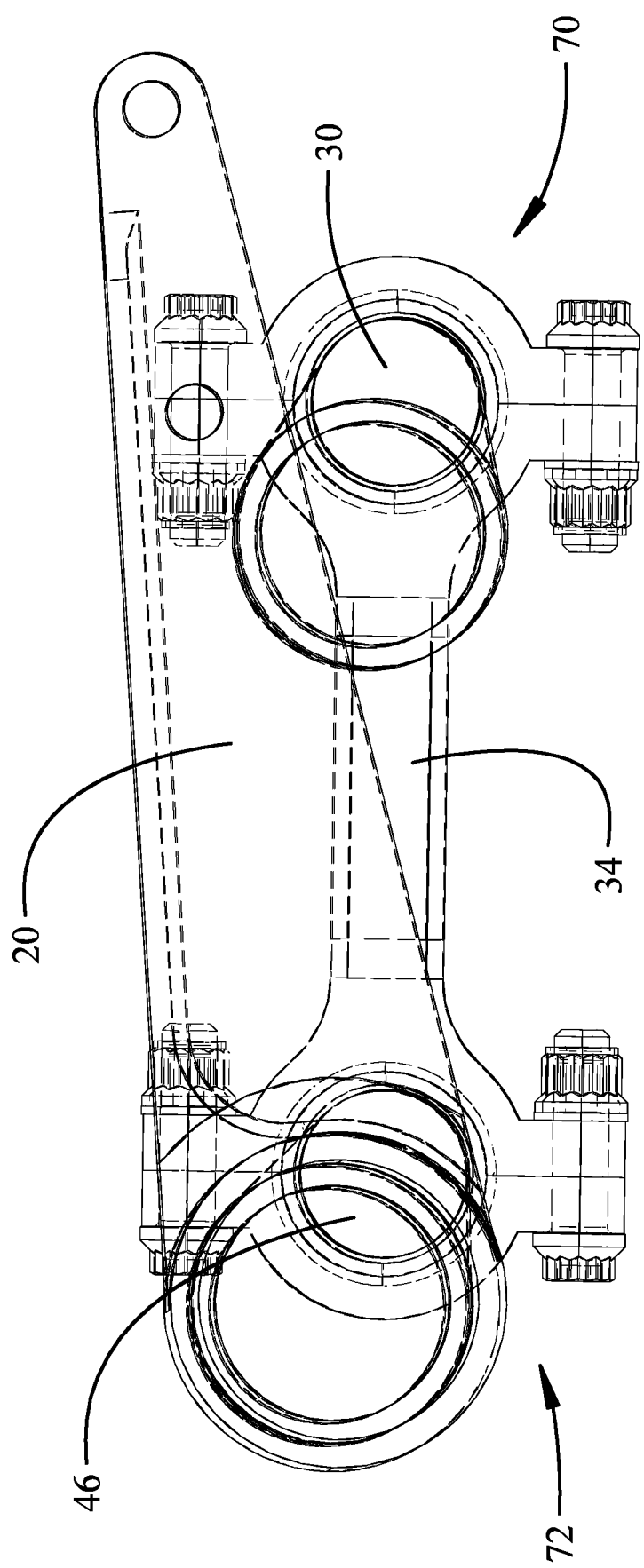
FIGS. 7A-7C are side views of the second implementation of the flap extension mechanism in the stowed position, 50% deployment and fully deployed positions with the support ribs remove for clarity.
Figure 7B:
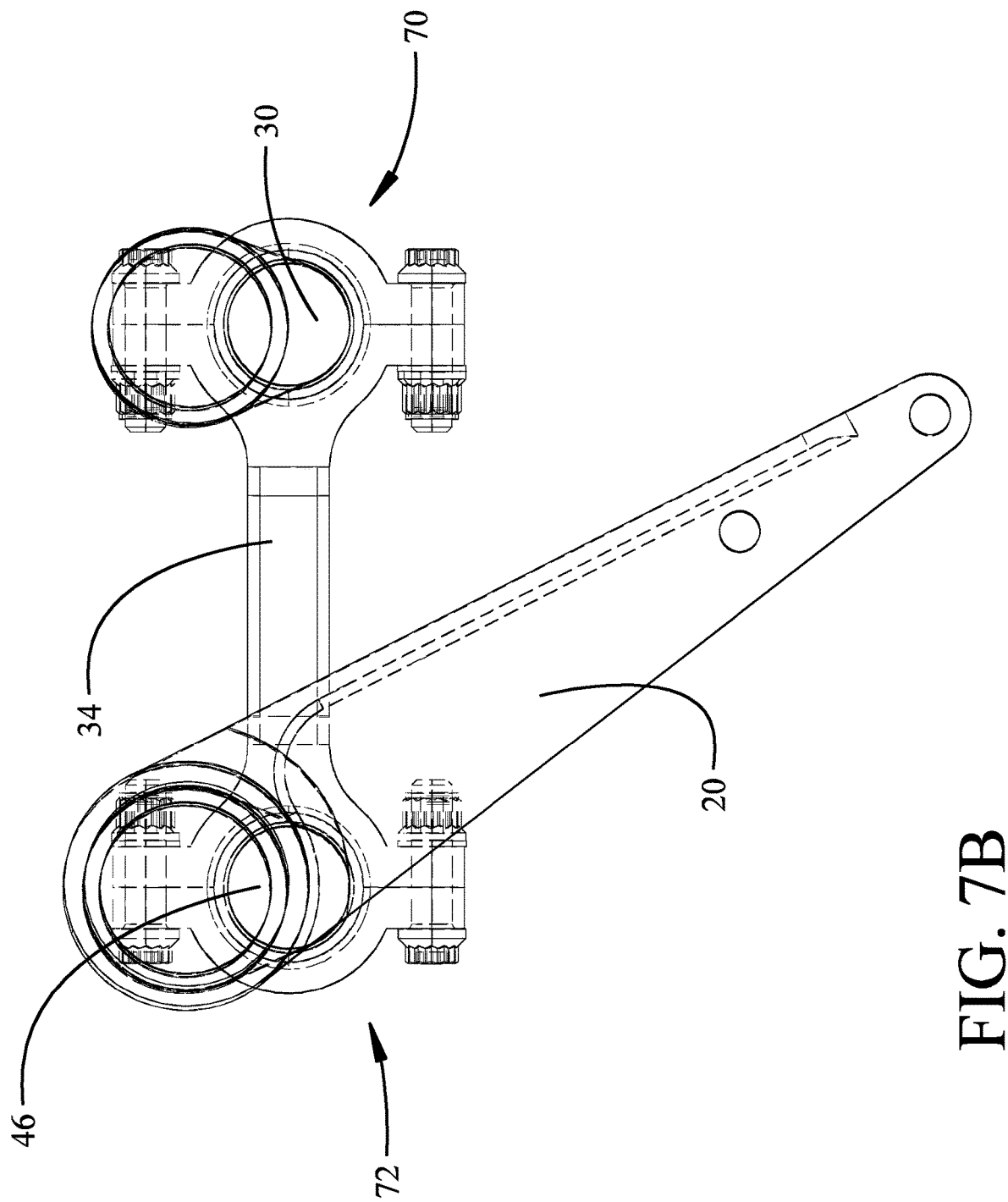
Figure 7C:
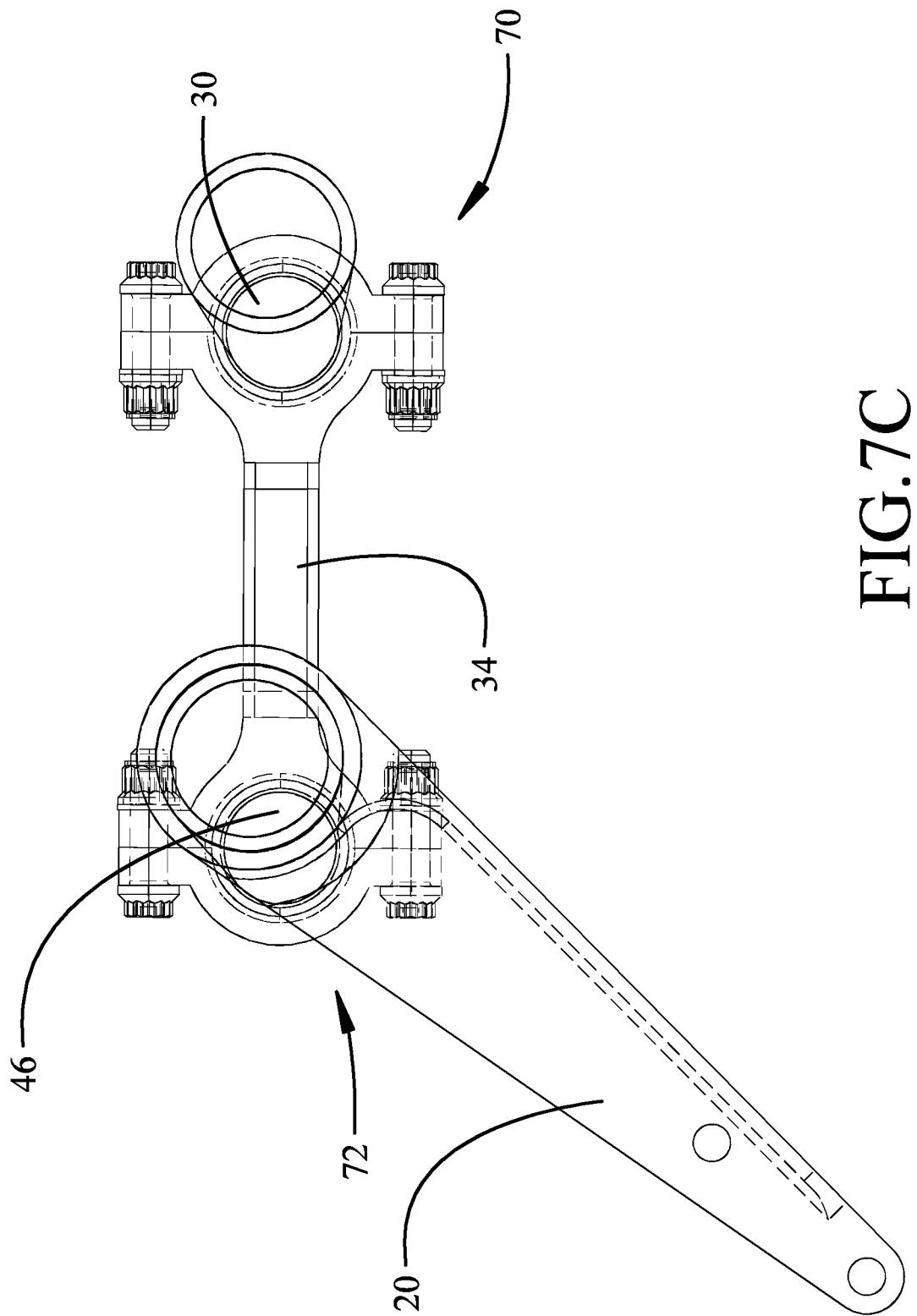

Operation of the second implementation is substantially identical to operation of the first implementation as shown in FIGS. 7A-7C. With the flap 14 in the retracted position and the aft and forward crank shafts 70, 72 are positioned in a substantially horizontal aft facing alignment as seen in FIG. 7A. Actuation of the rotary actuator 22 rotates the aft crankshaft 70 and inboard crank arm 27 causing the coupler rod 34 to translate to rotate the outboard crank arm 45 thereby rotating the flap drive arm 20. At a 50% deployed position as shown in FIG. 7B, the aft and forward crank shafts 70, 72 are in a substantially vertical position, downward in the example shown. Continuing rotation of the rotary actuator 22 results in full rotation of the flap drive arm to the deployed position placing the flap 14 in the extended position as seen in FIG. 7C. In the fully deployed position the aft and forward crank shafts 70, 72 are positioned in a substantially horizontal forward position. For the example shown, the crank shafts rotate through 180°.

Figure 8:
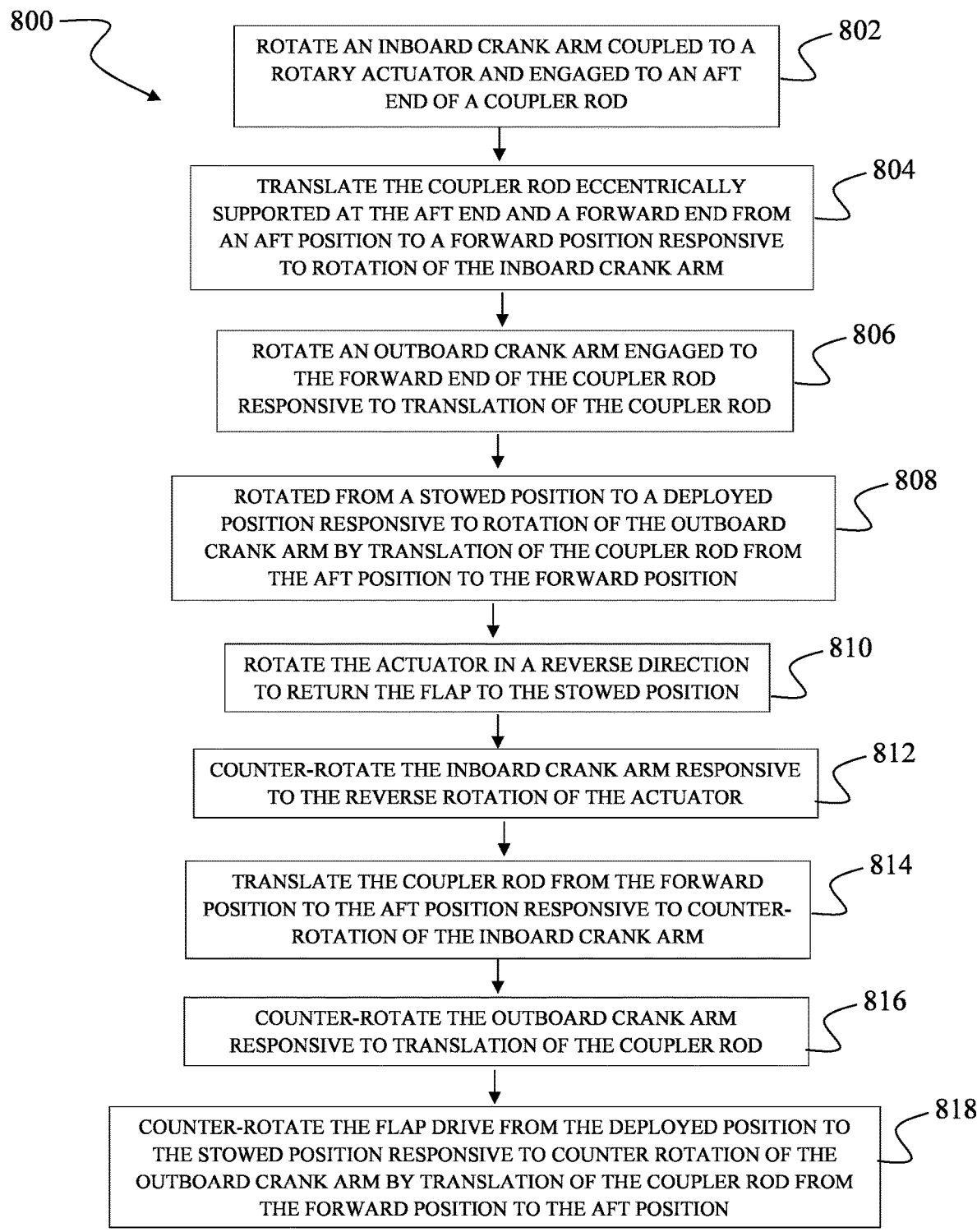
FIG. 8 is a flow chart of a method for extending a flap employing the flap extension mechanisms as disclosed.

The implementations described provide a method 800 of deploying a flap as shown in FIG. 8. An inboard crank arm coupled to a rotary actuator and engaged to an aft end of a coupler rod is rotated, step 802. The coupler rod eccentrically supported at the aft end and a forward end is translated from an aft position to a forward position responsive to rotation of the inboard crank arm, step 804. An outboard crank arm engaged to the forward end of the coupler rod is rotated responsive to translation of the coupler rod, step 806. A flap drive arm attached to the outboard crank arm is rotated from a stowed position to a deployed position responsive to rotation of the outboard crank arm by translation of the coupler rod from the aft position to the forward position, step 808. Return of the flap to a stowed position is accomplished by rotating the actuator in a reverse direction, step 810. The inboard crank arm is counter-rotated responsive to the reverse rotation of the actuator, step 812. The coupler rod is translated from the forward position to the aft position responsive to counter-rotation of the inboard crank arm, step 814. The outboard crank arm is counter rotated responsive to translation of the coupler rod form the forward to aft position, step 816, and the flap drive arm is counter rotated from the deployed position to the stowed position responsive to counter rotation of the outboard crank arm by translation of the coupler rod from the forward position to the aft position, step 818.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard" and "aft" and "forward" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A flap system comprising:
   a rotary actuator; and
   a flap actuation mechanism having:
   a coupler rod supported at an aft end and at a forward end, said coupler rod configured to translate from an aft position to a forward position;
   an inboard crank arm rotationally coupled to the rotary actuator and engaged to the aft end of the coupler rod, the inboard crank arm configured to induce eccentric rotation of the aft end of the coupler rod about a first rotation axis, wherein the eccentric rotation induces translation of the coupler rod;
   an outboard crank arm engaged to the forward end of the coupler rod, the outboard crank arm configured to rotate about a second rotation axis induced by eccentric rotation of the forward end of the coupler rod about the second rotation axis in response to translation of the coupler rod;
   a flap drive arm concentrically engaged with the outboard crank arm and configured to rotate with the outboard crank arm about the second rotation axis from a stowed position to a deployed position in response to translation of the coupler rod from the aft position to the forward position; and
   a flap connected to the flap drive arm and rotated from a retracted condition with the flap drive arm in the stowed position to an extended condition with the flap drive arm in the deployed position.

2. The flap system as defined in claim 1, wherein:
   a first eccentric half crank comprises the inboard crank arm and a first crank pin;
   a drive shaft extends from the rotary actuator and is connected to rotate the first eccentric half crank about the first rotation axis; and
   the first crank pin extends from the inboard crank arm at a first moment arm relative to the first axis of rotation and is operably coupled to the aft end of the coupler rod.

3. The flap system as defined in claim 2, wherein:
   a second eccentric half crank comprises the outboard crank arm and a second crank pin extending from the outboard crank arm, the second crank pin operably coupled to the forward end of the coupler rod for eccentric motion about the second rotation axis; and the second eccentric half crank is connected to rotate the flap drive arm about the second rotation axis, the second crank pin extending from the outboard crank arm at a second moment arm from the second rotation axis.

4. A flap actuation mechanism comprising:
a coupler rod supported at an aft end and a forward end and configured to translate from an aft position to a forward position;
an inboard crank arm engaged to the aft end of the coupler rod and configured to rotate in response to rotation of a rotary actuator, and configured to induce eccentric rotation of the aft end of the coupler rod about a first rotation axis, wherein the eccentric rotation induces translation of the coupler rod;
an outboard crank arm engaged to the forward end of the coupler rod and configured to rotate about a second rotation axis induced by eccentric rotation of the forward end of the coupler rod about the second rotation axis in response to translation of the coupler rod; and
a flap drive arm concentrically engaged with the outboard crank arm and configured to rotate with the outboard crank arm about the second rotation axis from a stowed position to a deployed position in response to translation of the coupler rod from the aft position to the forward position.

5. The flap actuation mechanism as defined in claim 4, wherein:
a first eccentric half crank comprises the inboard crank arm and a first crank pin;
a drive shaft extends from the rotary actuator rotating about the first rotation axis and is connected to rotate the first eccentric half crank; and
the first crank pin extends from the inboard crank arm at a first moment arm relative to the first rotation axis and is operably coupled to the aft end of the coupler rod.

6. The flap actuation mechanism as defined in claim 5, wherein the first eccentric half crank is rotatably supported in an inboard support rib by an aft bearing.

7. The flap actuation mechanism as defined in claim 5, wherein the first crank pin is received through a first spherical bearing in an aft aperture in the aft end of the coupler rod.

8. The flap actuation mechanism as defined in claim 5, wherein an outboard end of the first crank pin is supported in a first eccentric bearing mounted in a boss in a central support rib.

9. The flap actuation mechanism as defined in claim 8, wherein the first crank pin is received in a smooth bore in the first eccentric bearing.

10. The flap actuation mechanism as defined in claim 5, wherein:
a second eccentric half crank comprises the outboard crank arm and a second crank pin extending from the outboard crank arm, the second crank pin operably coupled to the forward end of the coupler rod; and
the second eccentric half crank is connected to rotate the flap drive arm about the second rotation axis, the second crank pin extending from the outboard crank arm at a second moment arm from the second rotation axis.

11. The flap actuation mechanism as defined in claim 10, wherein the second eccentric half crank is rotatably supported in a central support rib by a forward bearing.

12. The flap actuation mechanism as defined in claim 10, wherein the second crank pin is received through a second spherical bearing in a forward aperture in the forward end of the coupler rod.

13. The flap actuation mechanism as defined in claim 10, wherein an inboard end of the second crank pin is supported in a second eccentric bearing mounted in a boss in an inboard support rib.

14. The flap actuation mechanism as defined in claim 13, wherein the second crank pin is received in a smooth bore in the second eccentric bearing.

15. The flap actuation mechanism as defined in claim 14, wherein the flap drive arm has an inboard cylindrical stub connected to the second eccentric half crank and an outboard cylindrical stub supported in an outboard bearing in an outboard support rib.

16. The flap actuation mechanism as defined in claim 4, wherein:
an aft crankshaft comprises the inboard crank arm and a first crank pin, said aft crankshaft supported on an inboard stub by an inboard aft bearing in an inboard support rib, the inboard stub engaged by a drive shaft of the rotary actuator; and
the first crank pin extends from the inboard crank arm and is operably coupled to the aft end of the coupler rod.

17. The flap actuation mechanism as defined in claim 16, wherein:
a forward crankshaft comprises the outboard crank arm and a second crank pin, said forward crankshaft supported on an outboard stub by an outboard forward bearing in a central support rib, the outboard stub engaged to the flap drive arm; and
the second crank pin extends from the outboard crank arm and is operably coupled to the forward end of the coupler rod.

18. The flap actuation mechanism as defined in claim 17, wherein the first crank pin is received through a first split spherical bearing received in an aft saddle at the aft end of the coupler rod and secured by an aft arch clamp and wherein the second crank pin is received through a second split spherical bearing received in a forward saddle at the forward end of the coupler rod and secured by a forward arch clamp.

19. The flap actuation mechanism as defined in claim 17, wherein the flap drive arm has an inboard cylindrical stub connected to the outboard stub of the forward crankshaft and an outboard cylindrical stub supported in an outboard bearing in an outboard support rib.

20. A method for extending a flap comprising:
rotating an inboard crank arm coupled to a rotary actuator and engaged to an aft end of a coupler rod, the inboard crank arm configured to induce eccentric rotation of the aft end of the coupler rod about a first rotation axis;
translating the coupler rod supported at the aft end and a forward end from an aft position to a forward position in response to rotation of the inboard crank arm;
rotating an outboard crank arm engaged to the forward end of the coupler rod about a second rotation axis induced by eccentric rotation of the forward end of the coupler rod about the second rotation axis in response to translation of the coupler rod; and
rotating a flap drive arm concentrically engaged with the outboard crank arm to rotate with the outboard crank arm about the second rotation axis from a stowed position to a deployed position in response to translation of the coupler rod from the aft position to the forward position.

* * * * *